United States Patent
Goto et al.

(10) Patent No.: US 9,112,360 B2
(45) Date of Patent: Aug. 18, 2015

(54) POWER SUPPLY DEVICE

(75) Inventors: Masahiko Goto, Anjo (JP); Masaaki Fukumoto, Anjo (JP); Kazuyuki Sakakibara, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 0 days.

(21) Appl. No.: 13/503,532

(22) PCT Filed: Sep. 2, 2010

(86) PCT No.: PCT/JP2010/064999
§ 371 (c)(1),
(2), (4) Date: Apr. 23, 2012

(87) PCT Pub. No.: WO2011/052294
PCT Pub. Date: May 5, 2011

(65) Prior Publication Data
US 2012/0205984 A1    Aug. 16, 2012

(30) Foreign Application Priority Data

Oct. 30, 2009   (JP) ................................. 2009-250263

(51) Int. Cl.
*H02J 7/00* (2006.01)

(52) U.S. Cl.
CPC ............. *H02J 7/0024* (2013.01); *H02J 7/0063* (2013.01); *Y10T 307/685* (2015.04)

(58) Field of Classification Search
CPC .................................................... H02J 7/0024
USPC ......................................................... 320/117
See application file for complete search history.

(56) References Cited

U.S. PATENT DOCUMENTS

| | | | | |
|---|---|---|---|---|
| 5,712,553 A * | 1/1998 | Hallberg | ........................ | 307/75 |
| 6,351,097 B1 * | 2/2002 | Oh | ................. | 320/107 |
| 7,893,562 B2 * | 2/2011 | Oga | ................. | 307/71 |
| 2001/0054877 A1 * | 12/2001 | Kinoshita | ..................... | 320/112 |
| 2003/0071523 A1 * | 4/2003 | Silverman | ..................... | 307/150 |

(Continued)

FOREIGN PATENT DOCUMENTS

| CN | 2826797 U | 10/2006 |
|---|---|---|
| CN | 101297458 | 10/2008 |

(Continued)

OTHER PUBLICATIONS

Nov. 2, 2010 Written Opinion issued in International Patent Application No. PCT/JP2010/064999 (with translation).

(Continued)

*Primary Examiner* — Edward Tso
*Assistant Examiner* — Johali Torres Ruiz
(74) *Attorney, Agent, or Firm* — Oliff PLC

(57) ABSTRACT

A power supply device includes battery interfaces configured to removably receive at least three batteries and a connection circuit configured to electrically connect the at least three batteries to each other. The connection circuit is capable of connecting at least two batteries in parallel and connecting at least one other battery to the at least two parallel-connected batteries in series. According to this power supply device, it is possible to supply high power to an electric device by connecting the batteries in series. In addition, it is possible to supply almost all of the electric power stored in the batteries to the electric device, even if amount of the remaining electric power in each battery is substantially uneven.

11 Claims, 13 Drawing Sheets

(56) References Cited

U.S. PATENT DOCUMENTS

| | | |
|---|---|---|
| 2004/0049243 A1 | 3/2004 | Seligman |
| 2005/0023054 A1 | 2/2005 | Weidenheimer et al. |
| 2006/0092583 A1* | 5/2006 | Alahmad et al. ............... 361/15 |
| 2009/0134851 A1 | 5/2009 | Takeda et al. |
| 2009/0237012 A1 | 9/2009 | Yokoyama et al. |
| 2011/0001456 A1* | 1/2011 | Wang ........................... 320/117 |

FOREIGN PATENT DOCUMENTS

| | | |
|---|---|---|
| JP | A-8-256404 | 10/1996 |
| JP | A-2000-308268 | 11/2000 |
| JP | A-2007-229827 | 9/2007 |
| JP | A-2008-67500 | 3/2008 |
| JP | A-2010-172062 | 8/2010 |
| WO | WO 2007/046138 A1 | 4/2007 |

OTHER PUBLICATIONS

International Search Report issued in International Patent Application No. PCT/JP2010/064999 dated Nov. 2, 2010.
Oct. 15, 2013 Office Action issued in Japanese Application No. 2009-250263 (w/ English Translation).
Feb. 14, 2014 Office Action issued in Chinese Patent Application No. 2010800488068 (w/partial English Translation).
Apr. 4, 2014 Extended European Search Report issued in European Patent Application No. EP 10 82 6429.2.
Aug. 11, 2014 Russian Office Action issued in Russian Patent Application No. 2012122213 (with Translation).

* cited by examiner

POWER SUPPLY DEVICE

TECHNICAL FIELD

The present application relates to a device for supplying electric power to an electrical apparatus, and especially to a device for supplying electric power to an electrical apparatus from a plurality of batteries.

BACKGROUND ART

Electrical apparatuses using batteries as an electric power supply have been widely used. In electrical apparatuses of this kind, output can be increased and operation time can be extended by using a plurality of batteries. Thus, where a plurality of batteries connected in series is used, the output of the electrical apparatus can be increased, and where a plurality of batteries connected in parallel is used, the operation time of the electrical apparatus can be extended.

Japanese Patent Application Publication No. 2000-308268 discloses an electric power tool using two battery packs as an electric power supply. In this electric power tool, the attached two battery packs can be connected in series and also can be connected in parallel. Therefore, when the electric power tool is used for a heavy operation, the output of the electric power tool can be increased by connecting the two battery packs in series, and when the electric power tool is used for a light operation, the operation time of the electric power tool can be extended by connecting the two battery packs in parallel.

SUMMARY OF INVENTION

Technical Problem

Large electric power usually can be supplied to an electrical apparatus by connecting a plurality of batteries in series. However, when a plurality of batteries is connected in series, where the batteries are not in a substantially identical state, the entire electric power stored in the plurality of batteries cannot be supplied. For example, let us assume that the amount of electric power remaining in the batteries is not uniform. In the plurality of batteries connected in series, the same current flows in each battery and the batteries are discharged to a substantially identical electric power. Therefore, the battery with a smaller amount of remaining electric power is exhausted before other batteries. Where only some batteries are exhausted, even if energy remains in other batteries, no electric power can be supplied from the plurality of batteries connected in series.

However, it is difficult to prepare a plurality of batteries with a substantially identical amount of remaining electric power, unless new batteries are purchased. Further, when the batteries are rechargeable (secondary batteries), substantially identical amounts of remaining electric power can be obtained among the plurality of batteries by fully charging each of these batteries in advance. However, the charge capacity (amount of remaining electric power in a fully charged state) of a secondary battery decreases according to the usage history (number of usage cycles, usage period, past temperature, etc.) of the secondary battery. Therefore, even if all the batteries are fully charged in advance, where the batteries have different usage histories, there will be a difference in the amounts of remaining electric power.

In the light of the abovementioned problem, in the present specification, there is provided a technique that makes it possible to supply high power to an electrical apparatus by connecting batteries in series and supply a large amount of the electric power stored in a plurality of batteries to the electrical apparatus, even if the amount of remaining electric power in each battery is substantially uneven.

Solution to Technical Problem

The present specification discloses a power supply device that supplies electric power from a plurality of batteries to an electrical apparatus. The power supply device includes a plurality of battery interfaces configured to removably receive at least three batteries, and a connection circuit configured to electrically connect the at least three batteries attached by the interfaces to each other. The connection circuit is capable of connecting at least two batteries in parallel and connecting at least one other battery in series to the at least two parallel-connected batteries.

The battery referred to in the present specification is not limited to a battery cell and also includes a battery pack or a battery assembly incorporating a plurality of batteries. Further, the battery is not limited to a rechargeable secondary battery and may also be a non-rechargeable primary battery.

In the abovementioned device, where at least three batteries are received by the battery interfaces, at least two batteries are connected in parallel, and at least one other battery is connected in series to the at least two parallel-connected batteries. In other words, at least two batteries are connected in series and at least one other battery is connected in parallel to either of the two series-connected batteries. With such a connection, by connecting at least two batteries in series, it is possible to supply high electric power to an electrical apparatus, and by connecting some batteries in parallel, it is possible to reduce the electric power discharged in some batteries.

For example, let us assume that the amount of remaining electric power in each battery is uneven. In this case, in the abovementioned device, the battery with a small amount of remaining electric power might be connected in parallel to another battery, and a battery with a large amount of remaining electric power might be connected in series to the parallel-connected battery group. In this case, the electric power discharged from the battery with a small amount of remaining electric power becomes smaller, and the electric power discharged from the battery with a large amount of remaining electric power becomes larger. As a result, the difference in the amount of remaining electric power among the batteries is reduced. The event in which the electric power of only some of the batteries is rapidly consumed can be avoided, and a larger amount of electric power stored in each of the batteries can be supplied to the electrical apparatus.

It is preferred that the aforementioned connection circuit be capable of changing a combination of batteries connected in parallel without requiring to change positions of the batteries in the battery interfaces. As a result, the connection of the batteries can be adequately changed without removing the batteries from the battery interfaces.

In the abovementioned device, it is preferred that the connection of the batteries be changed according to the amount of remaining electric power in each battery. Further, the output voltage of a battery or the flowing current of a battery rises according to the amount of remaining electric power in the battery. Accordingly, it is preferred that the connection of the batteries be changed according to the output voltage of the batteries or the conduction current of the batteries. Alternatively, the amount of remaining electric power in the battery decreases according to the usage history of the battery. Accordingly, it is preferred that the connection of the batteries be changed according to the usage history (number of usage cycles, usage period, past temperature, etc.) of each battery even if the amount of remaining electric power in each battery is unclear. Further, since the internal resistance of the battery changes according to the usage history of the battery, it is preferred that connection of the batteries be changed according to the internal resistance of each battery. Further, the amount of heat generated when the battery is discharged increases with the increase in the internal resistance thereof. Therefore, it is preferred that the connection of the batteries be changed according to the battery temperature. It is further preferred that the connection of the batteries be changed according to an indicator indicative of condition of the battery other than the internal resistance of the battery.

As described hereinabove, the connection of the batteries is preferably changed according to the above-described indicator indicative of the condition of the battery, namely, the amount of remaining electric power, output voltage, flowing current, usage history, internal resistance, temperature, and degree of degradation. Accordingly, it is preferred that the abovementioned power supply device include a detector configured to detect at least one indicator indicative of condition of each battery attached to the battery interfaces, and a processor configured to group the at least three batteries attached to the battery interfaces into at least two battery groups such that at least one of the battery groups includes at least two batteries, on the basis of the indicator detected by the detector. In this case, it is preferred that the aforementioned connection circuit be configured to connect batteries grouped in the same battery group in parallel and connect batteries grouped in different battery groups in series. With such a power supply device, the connection of the batteries can be automatically changed according to an indicator indicative of condition of each battery.

It is preferred that the aforementioned detector detects at least the amount of electric power remaining in each battery. In this case, it is preferred that the processor performs the grouping such that a difference in total amounts of electric power between the battery groups becomes minimized. More specifically, as an example, it is preferred that the processor calculate the differences in the total amounts of electric power between the battery groups for at least two different groupings, and select either one of the groupings in which the calculated difference is the smallest. As a result, even when the amount of electric power remaining in the batteries is uneven, the event in which the electric power of only some of the batteries is rapidly consumed can be avoided, and a larger amount of electric power stored in all of the batteries can be, supplied to the electrical apparatus. However, the grouping processing is not limited to the above-described mode, the battery packs may be ranked on the basis of the amount of remaining electric power, and the grouping may be performed on the basis of the ranking. As an example, when three battery packs are used, where the battery pack with the largest amount of remaining electric power is classified into one group and the other two battery packs with a smaller amount of remaining electric power are classified to one group, the grouping can be performed such as to minimize the difference in the total amount of electric power between the battery groups, without calculating the difference.

It is preferred that the power supply device further includes a breaker configured to electrically break the aforementioned connection circuit when the connection circuit changes connection of the batteries. In this case, the breaker may be a contact relay or a contactless semiconductor switch. Where such a breaker is provided, the batteries can be prevented from being erroneously short circuited when connection of the batteries is changed.

It is preferred that the aforementioned breaker be located between two batteries that are connected in series, regardless of a manner of the connection of the batteries that is formed by the connection circuit. As a result, the batteries can be prevented from being erroneously short circuited for all possible changes in the connection of the batteries.

With the technique disclosed in the present specification, it is possible to supply high power to an electrical apparatus by connecting batteries in series and supply a large amount of the electric power stored in a plurality of batteries to the electrical apparatus, even if the amount of remaining electric power in each battery is substantially uneven.

BRIEF DESCRIPTION OF DRAWINGS

FIG. 9B shows schematically the connection shown in FIG. 9C.

FIG. 10A shows yet another example of connection of three battery packs initially formed by a connection circuit, FIG. 10B shows schematically the connection shown in FIG. 10A, FIG. 10C shows yet another example of connection of three battery packs formed by a connection circuit after a change, and FIG. 10D shows schematically the connection shown in FIG. 10C.

DETAILED DESCRIPTION OF INVENTION (Embodiment 1)

Figure 1:
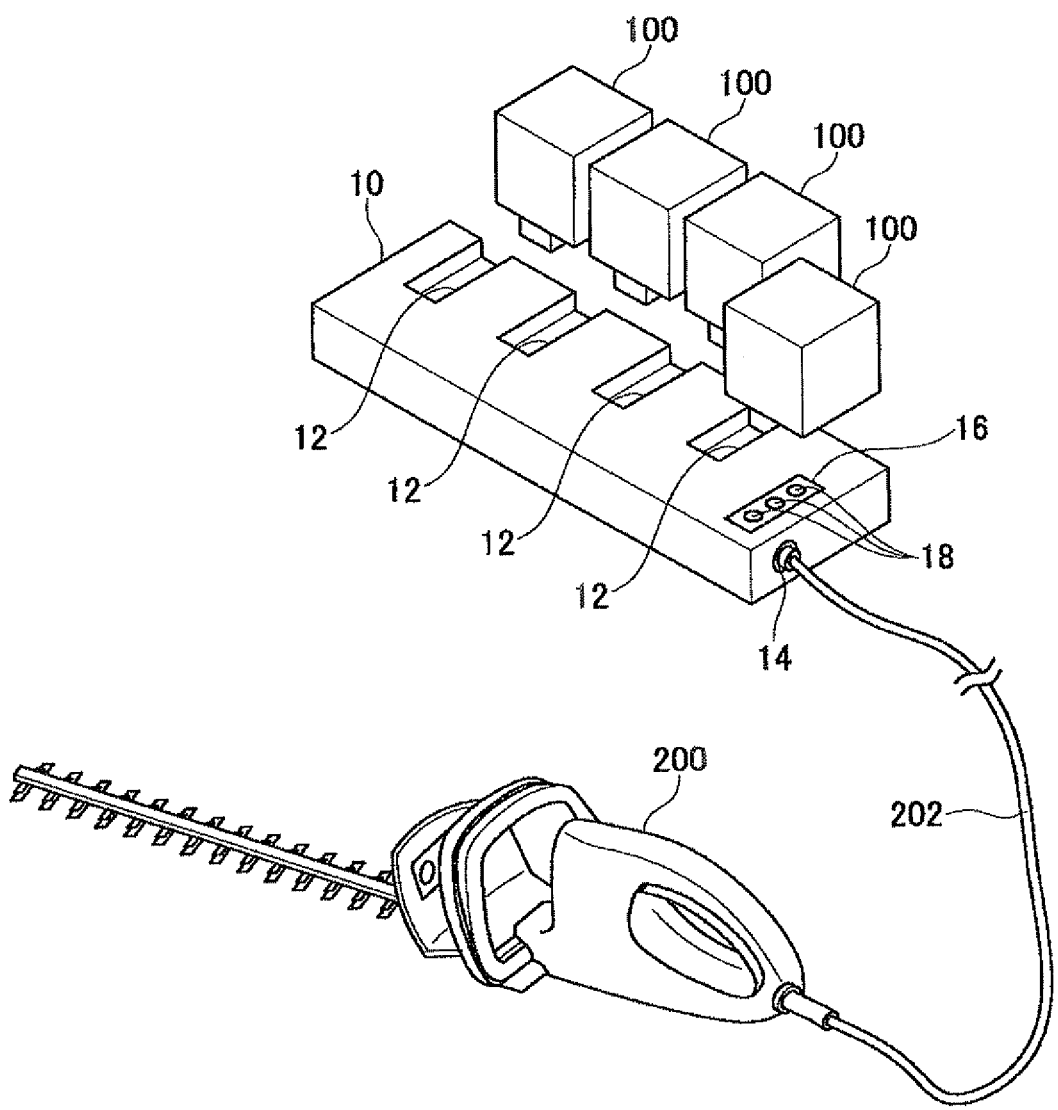
FIG. 1 shows schematically a power supply system of an embodiment.

A power supply system of an embodiment will be explained below with reference to the appended drawings. As shown in FIG. 1, the power supply system is provided with a power supply device 10 and a plurality of battery packs 100. The power supply device 10 is a device to which the plurality of battery packs 100 is connected and which supplies power from the plurality of battery packs 100 to a power tool 200. In this case, the power supply device 10 can supply power not only to the power tool 200, but also to any other electrical apparatus. Further, the power supply device 10 of the present embodiment is configured separately from the power tool 200, but the power supply device 10 may be integrally incorporated in the electrically apparatus to which power is supplied.

The power supply device 10 has four battery interfaces 12. The four battery interfaces 12 are provided at a housing of the power supply device 10. The battery pack 100 can be detachably attached to each battery interface 12. Each battery pack 100 is a battery pack for a power tool and can be individually used for power tools of various kinds. For example, the output voltage of each battery pack 100 is substantially 18 volts.

The power supply device 10 supplies power to the power tool 200 from the battery packs 100 attached to the four battery interfaces 12. The power supply device 10 can supply power to the power tool 200 at a voltage that is about twice as high as the output voltage of the battery pack 100 by connecting at least some of the attached battery packs 100 in series. Thus, where the output voltage of the battery pack 100 is 18 volts, power can be supplied to the power tool 200 at a voltage of 36 volts. The power supply device 10 does not necessarily require four battery packs 100, and power can be supplied to the power tool 200 at a voltage of about 36 volts by attaching at least two battery packs 100 With the power supply device 10, by using a plurality of battery packs 100, it is possible to drive a high-output power tool 200 that cannot be driven by one battery pack 100.

The power supply device 10 is provided with an output unit 14 that outputs power from the battery packs 100. The output unit 14 is provided at the housing of the power supply device 10. A cord 202 of the power tool 200 can be connected thereto. The power outputted by the power supply device 10 is supplied to the power tool 200 via the cord 202. The power supply device 10 is also provided with a display unit 16. The display unit 16 is provided at the housing of the power supply device 10. The display unit 16 has a plurality of light-emitting diodes 18 and displays various types of information such as the amount of remaining electric power in the battery packs 100 by selectively turning off and off the plurality of light-emitting diodes 18. The display unit 16 may also use another display device, such as a liquid crystal panel, instead of the plurality of light-emitting diodes 18.

Figure 2:
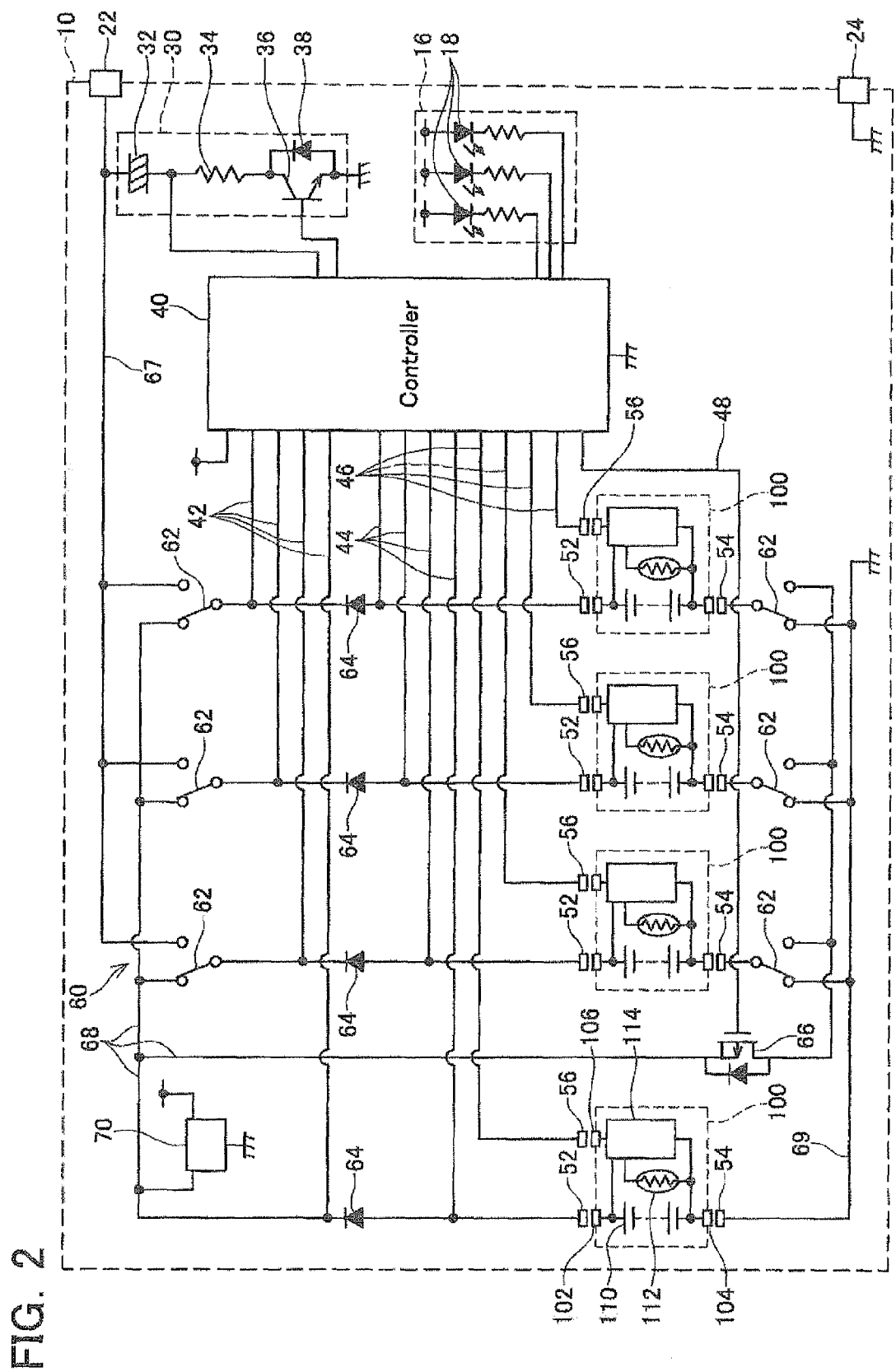
FIG. 2 is a circuit diagram illustrating the electrical configuration of the power supply system.

FIG. 2 is a circuit diagram illustrating the electrical configuration of the power supply device 10. FIG. 2 shows four battery packs 100 attached to the power supply device 10. Initially, the electrical configuration of the battery pack 100 will be explained. As shown in FIG. 2, the battery pack 100 is provided with a plurality of battery cells 110, a pair of battery output elements 102, 104, a temperature-sensing element 112, a battery controller 114, and a battery communication terminal 106. Each battery cell 110 is a secondary battery cell, more specifically, a lithium ion battery cell. The pair of battery output elements 102, 104 is provided with the battery positive electrode terminal 102 and the battery negative electrode terminal 104.

The pair of battery output terminals 102, 104 is connected to the plurality of battery cells 110 and output the power from the plurality of battery cells 110. The temperature-sensing element 112 is disposed close to the plurality of battery cells 110 and measures the temperature of the plurality of battery cells 110. The battery controller 114 is connected to the plurality of battery cells 110 and the temperature-sensing element 112. The battery controller 114 has a computational circuit and a storage circuit and monitors the voltage and temperature of the plurality of battery cells 110. As a result, the battery controller 114 creates and stores usage history information (including the number of charge cycles and past temperature) of the battery packs 100. The battery controller 114 also stores product information such as model, rated voltage, and rated capacity of the battery packs 100. The battery controller 114 is connected to the battery communication terminal 106 and can perform communication via the battery communication terminal 106 with an external device such as a charger or the power supply device 10 of the present embodiment.

The electrical configuration of the power supply device 10 will be described below. As shown in FIG. 2, the power supply device 10 is provided with a pair of output terminals 22, 24, four pairs of battery connection terminals 52, 54, and a connection circuit 60 that electrically connects the pair of output terminals 22, 24 and the four pairs of battery connection terminals 52, 54. The pair of output terminals 22, 24 includes the positive electrode output terminal 22 and the negative electrode output terminal 24. The pair of output terminals 22, 24 is provided at the output unit 14 shown in FIG. 1 and electrically connected by the cord 202 to the power tool 200.

The four pairs of battery connection terminals 52, 54 are provided at respective four battery interfaces 12. Thus, each battery interface 12 is provided with a pair of battery connection terminals 52, 54. Each pair of battery connection terminals 52, 54 is provided with the positive electrode connection terminal 52 and the negative electrode connection terminal 54. Where the battery pack 100 is attached to the battery interface 12, the pair of battery connection terminals 52, 54 is electrically connected to the pair of battery output terminals 102, 104 of the battery pack 100. As a result, the DC power from the battery pack 100 is supplied via the pair of battery connection terminals 52, 54 to the power supply device 10. The DC power inputted from the battery connection terminals 52, 54 is outputted via the connection circuit 60 from the pair of output terminals 22, 24.

In addition, one communication terminal 56 is further provided at each battery interface 12. The communication terminal 56 is electrically connected to the battery communication terminal 106 of the battery pack 100 attached to the battery interface 12. Thus, where the battery pack 100 is attached to the battery interface 12, the battery controller 114 is communicatively connected to the power supply device 10.

The connection circuit 60 has a high-potential connection wire 67, a medium-potential connection wire 68, a low-potential connection wire 69, six relays 62, four diodes 64, and a breaking switch 66. The high-potential connection wire 67 is connected to the positive electrode output terminal 22, and the low-potential connection wire 69 is connected to the negative electrode output terminal 24. The medium-potential connection wire 68 is provided independently from the high-potential connection wire 67 and the low-potential connection wire 69. Where the relays 62 are switched by the connection circuit 60, each positive electrode connection terminal 52 is electrically connected to one of the high-potential connection wire 67 and the medium-potential connection wire 68, and each negative electrode connection terminal 54 is electrically connected to one of the medium-potential connection wire 68 and the low-potential connection wire 69. However, concerning the pair of battery connection terminals 52, 54 positioned at the leftmost side in FIG. 2, the positive electrode connection terminal 52 is directly connected to the medium-potential connection wire 68 and the negative electrode connection terminals 54 is directly connected to the low-potential connection wire 69 in order to reduce the number of relays 62. As a result, eight relays 62 are not required, and the connection of the four attached battery packs 100 can be performed by selectively switching six relays 62.

Each diode 64 is connected to the positive electrode connection terminal 52 to prevent a reverse current from flowing to the battery pack 100. The breaking switch 66 is provided at the medium-potential connection terminal 68. The breaking switch 66 is an element that electrically disconnects the connection circuit 60 as necessary. In the present embodiment, a field effect transistor (FET) is used as the breaking switch. In this case, a configuration can be used in which a semiconductor switch such as a field effect transistor is used for each relay 62, thereby making it possible to change the connection state instantaneously. Each relay 62 may be a contact relay or a contactless semiconductor switch.

FIG. 3 illustrates connection of a plurality of battery packs 100 that can be performed by the connection circuit 60. In the case where two battery packs 100 are attached, as shown in FIG. 3A, the connection circuit 60 connects the two battery packs 100 in series. Where at least three battery packs 100 are attached, as shown in FIGS. 3B to 3F, the connection circuit 60 connects at least two battery packs 100 in parallel and connects at least one another battery pack 100 in series to the at least two parallel-connected battery packs 100. In any connection mode, since there are two series-connected battery packs 100, the power supply device 10 can supply electric power to the power tool 200 at a voltage (in the present embodiment, 36 volts) that is twice the output voltage of a single battery pack 100.

In all of the connection modes shown in FIGS. 3A to 3F, electric power is supplied to the power tool 200 at substantially the same voltage (36 volts). However, the current flowing in each battery pack 100 changes differently depending on the connection mode. For example, with the connection shown in FIG. 3A, substantially the same current flows in the battery pack 100 positioned at the upper stage and the battery pack 100 positioned at the lower stage, and substantially the same electric power is discharged from each battery pack 100 (the amounts of power discharged per unit time are substantially the same). Let us assume, for example, that the amount of remaining electric power in the battery pack 100 positioned at the upper stage is 100% (ratio to the capacitance), and the amount of remaining electric power in the battery pack 100 positioned at the lower stage is 50%. In this case, the electric power in the battery pack 100 positioned at the lower stage will be consumed earlier, and at this point of time, no power can be anymore supplied from the two series-connected battery packs 100 even though the electric power of 50% still remains in the battery pack 100 positioned at the upper stage. Thus, even when the total electric power of 150% remains in the two prepared battery packs 100 (1.5 times the power of the fully charged battery pack 100), eventually only the electric power of 100% (power of one fully charged battery pack) can be supplied. Thus, when electric power is supplied by only two battery packs 100, the entire electric power stored in the battery packs 100 cannot be supplied, unless the amount of remaining electric power in the two battery packs 100 is substantially the same.

Figure 3A:
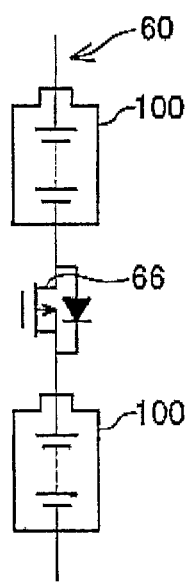
FIGS. 3A to 3F illustrate connections of battery packs that can be realized in the power supply system.
Figure 3B:
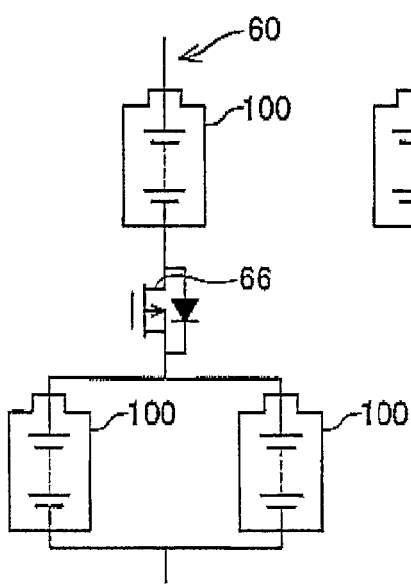
Figure 3C:
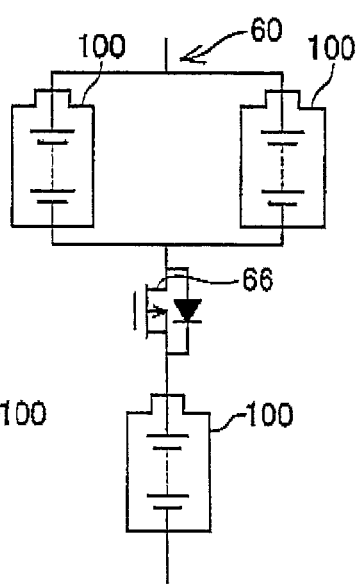
Figure 3D:
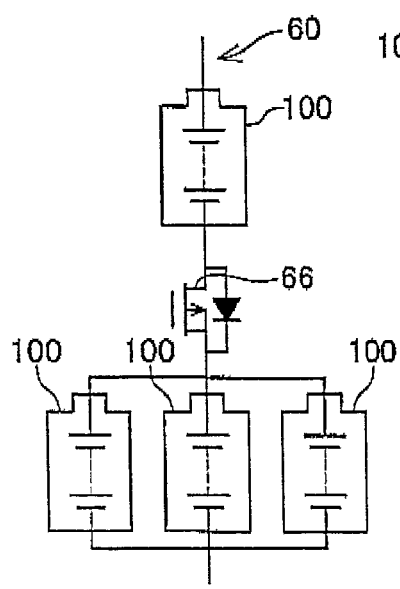
Figure 3E:
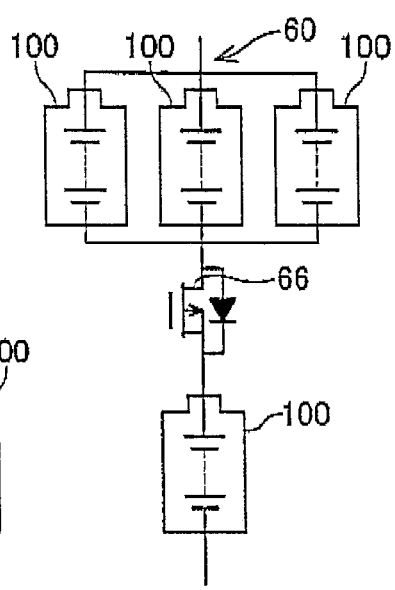

By contrast, for example, in the connection mode shown in FIG. 3B, a large current flows in the battery pack 100 positioned at the upper stage and a small current flows in the two battery packs 100 positioned at the lower stage. Therefore, there is a difference in electric power discharged by each battery pack 100 (amount of electric power discharged per unit time) between the battery pack 100 positioned at the upper stage and the two battery packs 100 positioned at the lower stage. Simply speaking, the electric power discharged by each battery pack 100 positioned at the lower stage is substantially half that discharged by the battery pack 100 positioned at the upper stage. Let us assume, for example, that the amount of remaining electric power in the battery pack 100 positioned at the upper stage is 100%, and the amount of remaining electric power in the battery pack 100 positioned at the lower stage is 50%. In this case, the electric power discharged by each battery pack 100 positioned at the lower stage is substantially half that discharged by the battery pack 100 positioned at the upper stage. As a result, the three battery packs 100 discharge the entire power at substantially the same timing and the entire stored power can be discharged. Thus, the entire amount of power of a total of 200% (two amounts of power in a fully charged battery pack) remaining in the three prepared battery packs 100 can be supplied to the power tool 200. Therefore, by adding only one battery pack 100 with an amount of remaining electric power of 50%, it is possible to supply additional electric power corresponding to that of one fully charged battery pack In comparison with the connection mode shown in FIG. 3B explained in the preceding paragraph.

As mentioned hereinabove, in the power supply device 10 of the present embodiment, at least three battery packs 100 can be connected by combining parallel connection with series connection. As a result, electric power can be supplied at a high voltage to the power tool 200. Furthermore, even when the amount of remaining power in the battery packs 100 is not uniform, larger amount of electric power stored in the battery packs 100 can be supplied. Since the connection is changed by the relays 62, the user is not required to change the positions of the battery packs 100 attached to the battery interfaces 12. Further, in the power supply device 10 of the present embodiment, it is possible, as will be described hereinbelow, to detect the amount of remaining power in the attached battery packs 100 and form automatically the adequate connection.

In addition, as shown in FIGS. 3A to 3F, with all connections formed by the connection circuit 60, the breaking switch 66 can be introduced between the battery packs 100 that are connected in series to each other. As a result, the battery packs 100 can be reliably prevented from being short circuited by switching off (opening) the breaking switch 66 when the connection is changed.

Another configuration of the power supply device 10 will be explained below. As shown in FIG. 2, the power supply device 10 is provided with a tool switch detection unit 30, a backup power supply unit 70, and a main controller 40.

The main controller 40 is configured by using a microcomputer and has a computational circuit and a storage circuit. The main controller is connected to the relays 62 of the connection circuit 60 and can selectively switch the six relays 62. Further, the main controller 40 is connected by voltage detection lines 42, 44 to the connection circuit 60 and can detect the output voltage, flowing current, amount of remaining electric power, and internal resistance of each battery pack 100 on the basis of the voltage of the voltage detection lines 42, 44. For example, the main controller 40 can detect the output voltage of each battery pack 100 on the basis of the voltage of the voltage detection line 44. The main controller 40 can also calculate the amount of remaining electric power in each battery pack 100 on the basis of the detected output voltage. The main controller 40 can also detect the flowing current in the battery pack 100 on the basis of a difference in voltage between the voltage detection line 42 and the voltage detection line 44. In this case, a difference in voltage caused by the diode 64 occurs in response to the flowing current of the battery pack 100 between the voltage detection line 42 and the voltage detection line 44. Furthermore, the main controller 40 can also calculate the internal resistance of the battery pack 100 on the basis of the detected output voltage and flowing current of the battery pack 100.

The main controller 40 is connected to each light-emitting diode 18 of the display unit 16 and can selectively on/off switch the three light-emitting diodes 18. The main controller 40 is connected to the breaking switch 66 of the connection circuit 60 and can on/off switch the breaking switch 66. The main controller 40 is connected to each communication terminal 56 and can be communicatively connected to the battery controller 114 of the battery pack 100. As a result, the main controller 40 can read the usage history information and product information stored in the battery controller 114.

The backup power supply unit 70 receives power supply from the battery packs 100 and supplies electric power to the main controller 40. The backup power supply unit 70 has a power storage unit such as a capacitor or secondary battery and can supply power to the main controller 40 even when the battery packs 100 are not attached. Where each relay 62 is switched as shown in FIG. 2 at the initial stage, when at least one battery pack 100 is attached to any of the battery interfaces 12, power supply to the backup power supply unit 70 is started. In this case, the backup power supply unit 70 does not necessarily require a power storage unit.

The tool switch detection unit 30 is configured by using a capacitor 32, a resistor 34, a transistor 36, and a diode 38. The capacitor 32, the resistor 34, and the transistor 36 are connected in series. The diode 38 is connected in parallel to the transistor 36 in reverse polarity. The tool switch detection unit 30 is connected to the pair of output terminals 22, 24 and the main controller 40. The main controller 40 can detect the voltage of the capacitor 32 and control the operation of the transistor 36. The main controller 40 can detect with the tool switch detection unit 30 that the switch of the power tool 200 has been switched on.

The tool switch detection unit 30 will be described below in greater detail. The main controller 40 detects the voltage of the capacitor 32 and, where the capacitor 32 is not charged, charges the capacitor 32 by switching on the transistor 36. In this case, the main controller 40 issues a command to the breaking switch 66 of the connection circuit 60 and the breaking switch 66 is also switched on. The power for charging the capacitor 32 is supplied from the battery pack 100. Where the main controller 40 then detects that the charging of the capacitor 32 has been completed, the main controller switches off the breaking switch 66 of the connection circuit 60 and the transistor 36 of the tool switch detection unit 30.

Where the switch of the power tool 200 is switched on, the electric power charged into the capacitor 32 is supplied through the pair of output terminals 22, 24 to the power tool 200. In this case, the breaking switch 66 of the connection circuit 60 is switched off. Therefore, the voltage of the capacitor 32 decreases or the voltage between the terminals of the resistor 34 changes from positive to negative. The main controller 40 can detect that the switch of the power tool 200 has been switched on by detecting these voltage variations. Meanwhile, where the main controller 40 detects that no electric current flows in any of the battery packs 100, the switch of the power tool 200 is determined to be switched off.

Figure 4A:
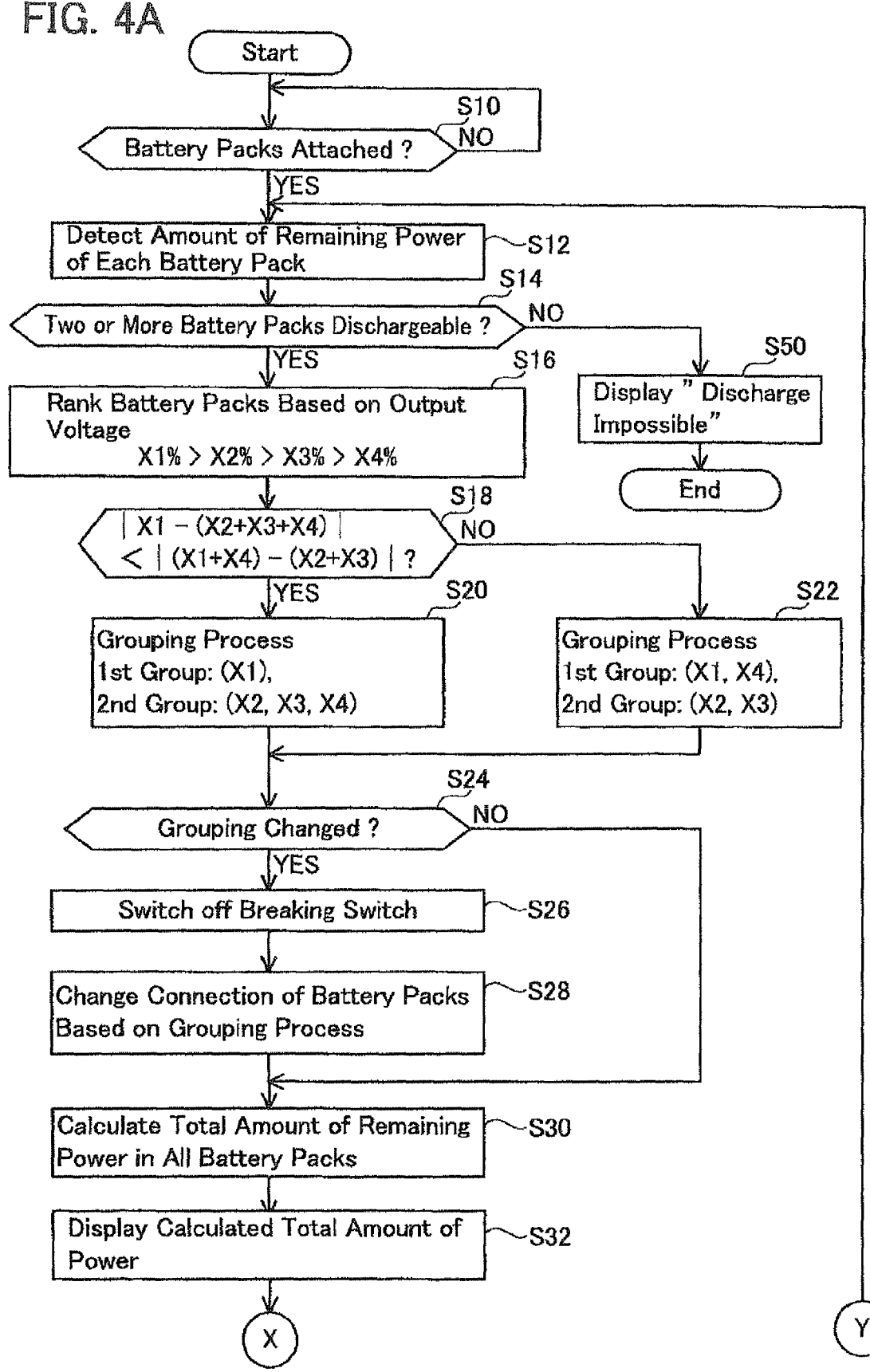
FIG. 4A is a flowchart illustrating, together with FIG. 4B, the operation of the power supply system, and in the figures, X in FIG. 4A is continued by X in FIG. 4B, and Y in FIG. 4A is the continuation of Y in FIG. 4B.
Figure 4B:
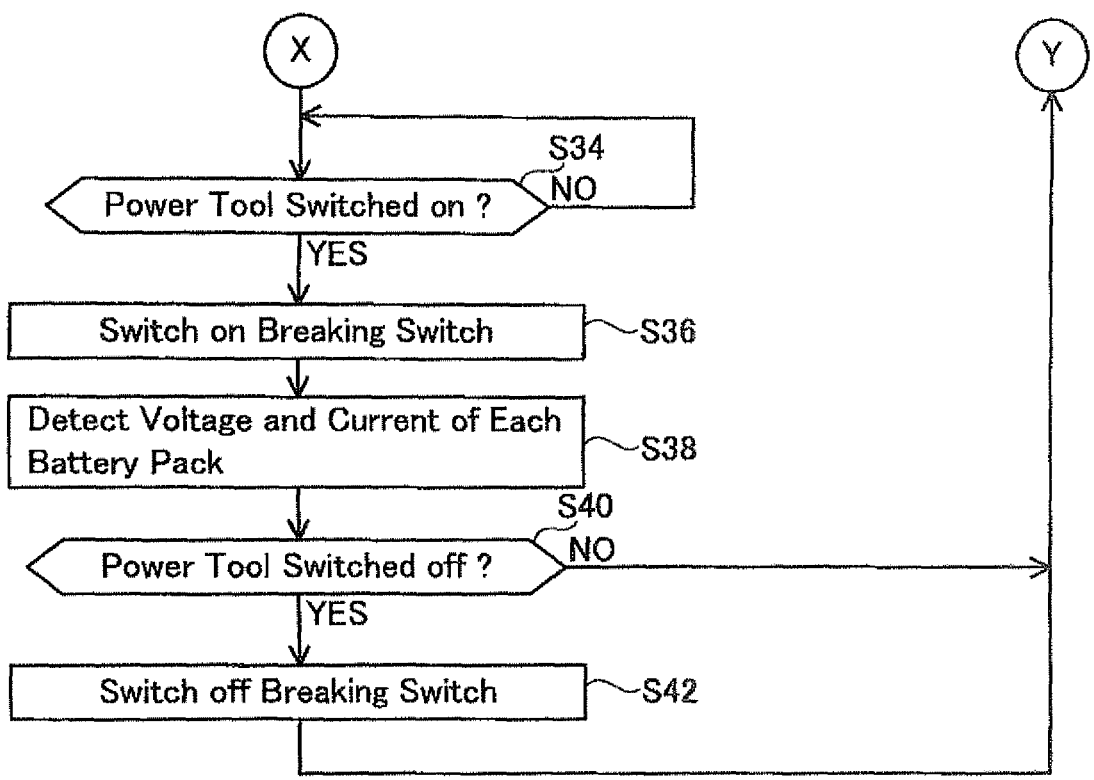
FIG. 4B is a flowchart illustrating, together with FIG. 4A, the operation of the power supply system.
Figures 5A, 5B:
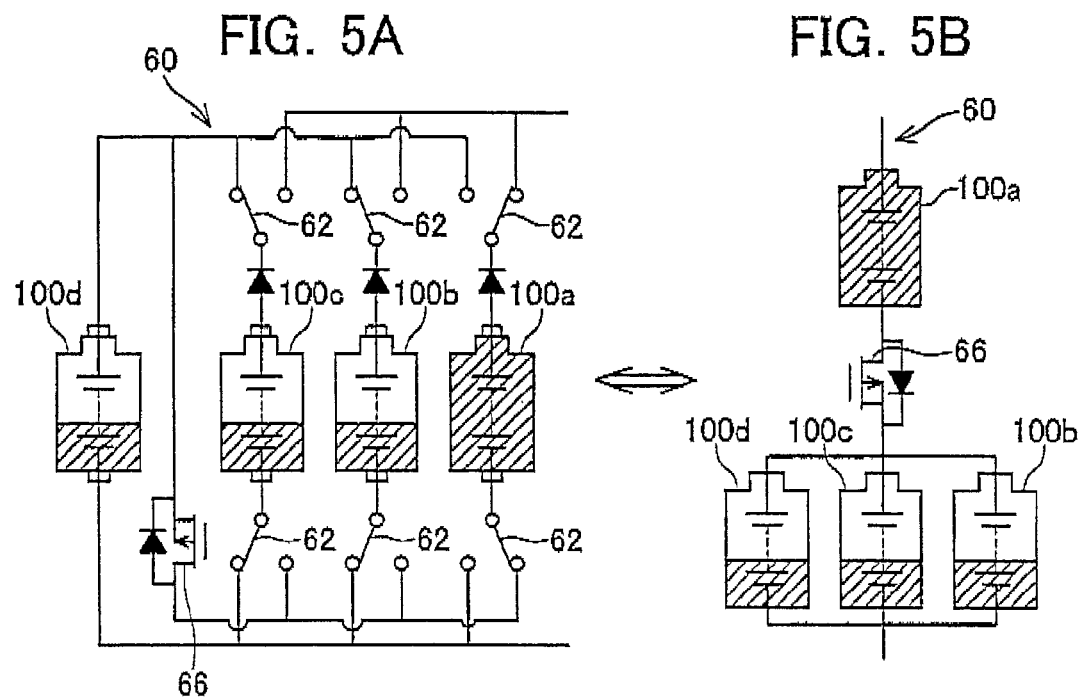
FIG. 5A shows an example of connection of four battery packs formed by a connection circuit.
FIG. 5B shows schematically the connection shown in FIG. 5A.

The operation of the power supply device 10 will be described below with reference to the flowcharts shown in FIGS. 4A and 4B. In step S10, the power supply device 10 is in a standby mode till the battery packs 100 are attached to the battery interfaces 12. The attachment of the battery packs 100 is detected by the main controller 40. The main controller 40 detects the attachment of the battery packs 100 by monitoring the voltage of the voltage detection line 44. Where the four battery packs 100 have been attached or a predetermined time has elapsed since the first battery pack 100 has been attached, the main controller 40 advances to step S12. In this case, the explanation is continued under an assumption that the four battery packs 100a to 100d have been attached, as shown in FIG. 5A.

In step S12, the main controller 40 detects the amount of remaining electric power in each battery pack 100. The amount of remaining electric power in the battery packs 100 is detected on the basis of the output voltage of the battery packs 100. Thus, the main controller 40 detects the output voltage of each battery pack 100 with the voltage detection line 44 and calculates the amount of remaining electric power in each battery pack 100 on the basis of the detected output voltage. In this case, the explanation below is continued under an assumption that the amount of remaining electric power in one battery pack 100a is about 100% and the amount of remaining electric power in other three battery packs 100b to 100d is about 40%. In the drawings, the amount of remaining electric power in the battery packs 100 is schematically shown by hatching.

In step S14, the main controller 40 determines whether or not there are two or more dischargeable battery packs 100 on the basis of the amount of remaining electric power in each battery pack 100 detected in step S12. Where there are two or more battery packs 100 with remaining electric power, the main controller 40 advances to step S16, otherwise the main controller advances to step S50. In the case where only one battery pack 100 is attached, the main controller 40 advances to the processing of step S50 because two or more battery packs 100 with remaining electric power are not present. In the case of advancing to step S50, the main controller 40 displays with the display unit 16 that the discharge is impossible and requests that the user replace the battery packs 100 (end of processing).

After advancing to step S16, the main controller 40 ranks the battery packs 100 on the basis of the amount of remaining electric power in each battery pack 100 detected in step S12. Thus, the battery pack with the largest amount of remaining electric power X1 is taken as the first battery pack 100, the battery pack with the second largest amount of remaining electric power X2 is taken as the second battery pack 100, the battery pack with the third largest amount of remaining electric power X3 is taken as the third battery pack 100, and the battery pack with the fourth largest amount of remaining electric power X4 is taken as the fourth battery pack 100. In the example shown in FIG. 5A, the battery pack 100a having an amount of remaining electric power of 100% is taken as the first battery pack, and the battery packs 100b to 100d having an amount of remaining electric power of 40% are taken as the second to fourth battery packs.

Then, in steps S18, S20, and S22, the main controller 40 performs the grouping of the four attached battery packs 100 into two battery groups. In this case, the main controller 40 performs the grouping of the battery packs 100 such that a difference in total amounts of electric power calculated for each battery group is minimized. For this purpose, in step S18, the main controller 40 determines whether or not Equation (1) below is fulfilled. The total amount of electric power of a battery group means the total amount of remaining electric power in one or a plurality of battery packs 100 included in the battery group.

$$|X1-(X2+X3+X4)|<|(X1+X4)-(X2+X3)| \quad (1)$$

The left side of Equation (1) above is an expression for calculating the difference in total amounts of electric power (X1 and X2+X3+X4) between battery groups in the case where one battery group is constituted only by the first battery pack 100a and the other battery group is constituted by the second to fourth battery packs 100b to 100d (referred to hereinbelow as the first grouping). The right side of Equation (1) above is an expression for calculating the difference in total amounts of electric power (X1+X4 and X2+X3) between battery groups in the case where one battery group is constituted by the first and fourth battery packs 100a and 100d and the other battery group is constituted by the second and third battery packs 100b and 100c (referred to hereinbelow as the second grouping). Thus, Equation (1) above determines the relationship between the difference in the total amounts of electric power between the battery groups in the case of the first grouping and the difference in the total amounts of electric power between the battery groups in the case of the second grouping. When Equation (1) is fulfilled, the main controller 40 advances to step S20; otherwise, the main controller 40 advances to step S22.

In steps S20, S22, the grouping of the battery packs 100a to 100d is determined. When the processing has advanced to step S20, the main controller 40 uses the first grouping. Thus, the first battery pack 100a is classified into one battery group and the second to fourth battery packs 100b to 100d are classified into the other battery group. Where the processing has advanced to step S22, the main controller 40 uses the second grouping. Thus, the first and fourth battery packs 100a and 100d are classified into one battery group and the second and third battery packs 100b and 100c are classified into the other battery group. As a result, among the first and second groupings, the grouping with a smaller difference in the total amounts of electric power calculated for each battery group is selected. Where the amount of remaining electric power X1 of the first battery pack 100a is 100% and the amounts of remaining electric power X2 to X4 of the second to fourth battery packs 100b to 100d are 40%, as has been assumed hereinabove, the first grouping is selected.

In steps S24 to S28, connection of the four battery packs 100 is changed on the basis of the grouping determined by the grouping processing. First, in step S24, the main controller 40 determines whether or not the grouping has been changed in the above-described grouping processing. Thus, it is determined whether the same grouping has been selected again or a different grouping has been selected, as compared with the state prior to the grouping processing. Where the grouping is changed, the main controller 40 advances to step S26; otherwise, the main controller advances to step S30. Thus, where the grouping is not changed, the connection is also not changed.

In step S26, the main controller 40 turns off the breaking switch 66 prior to changing the connection. As a result, the medium-potential connection wire 68 of the connection circuit 60 is electrically disconnected and the formation of an unintended connection path, for example, such that erroneously short circuits the battery packs 100 is prevented. Then, in step S28, the main controller 40 selectively switches the relays 62 of the connection circuit 60 on the basis of the determined groupings. More specifically, the relays 62 are selectively switched so that the battery packs 100 classified into the same battery group are connected in parallel and the battery packs 100 classified into different battery groups are connected in series. Where the first grouping is selected, as assumed hereinabove, the relays 62 are switched as shown in FIG. 5A. As a result, as shown in FIG. 5B, the connection circuit 60 connects in parallel the second to fourth battery packs 100b to 100d that are classified to the same battery group and connects the first battery pack 100a in series with the second to fourth parallel-connected battery packs 100b to 100d.

In step S30, the main controller 40 calculates the total amounts of electric power remaining in all of the battery packs 100. Then, in step S32, the main controller 40 displays the calculated total amounts of electric power on the display unit 16. The power display device 10 of the present embodiment can use substantially all the total amounts of electric power remaining in all of the battery packs 100 by adequately changing the connection of the battery packs 100. Therefore, the total amount of electric power displayed by the display unit 16 accurately matches the amount of electric power that is actually supplied by the power supply device 10.

In step S34, the power supply device 10 stands by till the switch of the power tool 200 is switched on. In this case, the tool switch detection unit 30 detects that the power tool 200 is switched on. At this point in time, the breaking switch 66 of the connection circuit 60 is switched off. Therefore, even if the power tool 200 is switched on, no electric power is supplied from the battery packs 100 to the power tool 200. The main controller 40 advances to the processing of step S36 when the power tool 200 is detected to be switched on.

In step S36, the main controller 40 switches on the breaking switch 66 of the connection circuit 60. As a result, the supply of electric power from the battery packs 100 to the power tool 200 is started. In step S38, the main controller 40 detects the output voltage and flowing current of each battery pack 100. The output voltage and flowing current of each battery pack 100 are detected on the basis of the voltage of the voltage detection lines 42, 44.

In step S40, the main controller 40 determines whether or not the switch of the power tool 200 is off. In this case, the power tool 200 is switched off on the basis of the flowing current detected in step S36. Thus, where the flowing current of all of the battery packs 100 is zero, the main controller 40 determines that the switch of the power tool 200 has been switched off. Where the switch of the power tool 200 is switched off, the main controller 40 advances to step S42 and switches off the breaking switch 66. The processing then returns to step S12.

Where the switch of the power tool 200 is not switched off, the main controller 40 directly returns from step S40 to step S12. In this case, power supply to the power tool 200 is continued. Where the processing returns to step S12, the above-described grouping of the battery packs 100 and the change of connection based on the grouping are performed again. Thus, the connection of the battery packs 100 is changed as appropriate according to the amount of remaining electric power in each battery pack 100 even when the electric power is supplied to the power tool 200.

As the electric power is supplied to the power tool 200, the amount of remaining electric power in each battery pack 100 decreases. With the connection shown by way of example in FIGS. 5A and 5B, the power discharged from the first battery pack 100a is about three times that discharged from the parallel-connected other battery packs 100b to 100d. Therefore, the difference between the amount of remaining electric power in the first battery pack 100a (X1=100%) and the amount of remaining electric power in the second to fourth battery packs 100b to 100d (X2 to X4=40%) gradually decreases, and at a state at which 90% of the amount of electric power of the first battery pack 100a is consumed, the amount of remaining electric power becomes the same in all of the battery packs 100a to 100d (per calculations, X1 to X4=10%). Where the connection shown in FIGS. 5A and 5B is maintained as is at this stage, the first battery pack 100a is the first to be exhausted and the power supply is interrupted, while electric power still remains in other battery packs 100b to 100d.

However, in the power supply device 10 of the present embodiment, the connection of the battery packs 100a to 100d is changed according to the amount of remaining electric power in the battery packs 100a to 100d. More specifically, where the amount of remaining electric power in all of the battery packs 100a to 100d is the same (X1 to X4=10%), the connection of the battery packs 100a to 100d is changed to that shown in FIGS. 6A and 6B. In the connection shown in FIGS. 6A and 6B, all of the battery packs 100a to 100d discharge the same electric power. Therefore, the electric power stored in all of the battery packs 100b to 100d can be completely discharged at about the same time. As a result, the electric power of all of the battery packs 100b to 100d is supplied without a loss to the power tool 200.

Figures 6A, 6B:
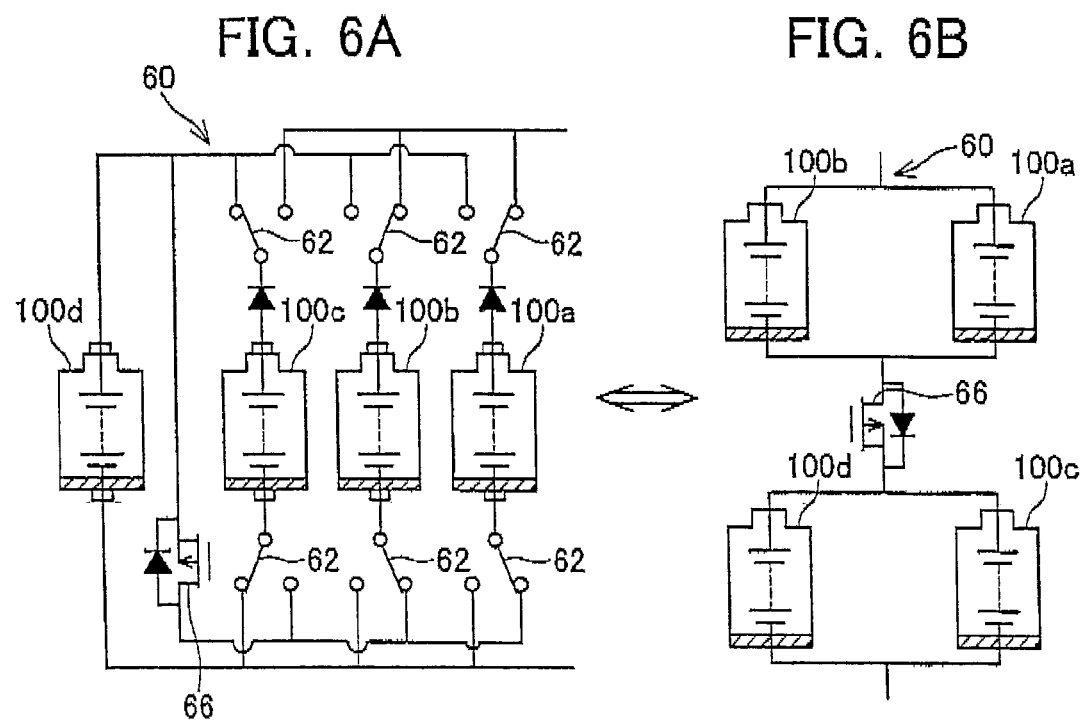
FIG. 6A shows another example of connection of four battery packs formed by a connection circuit.
FIG. 6B shows schematically the connection shown in FIG. 6A.
Figure 7:
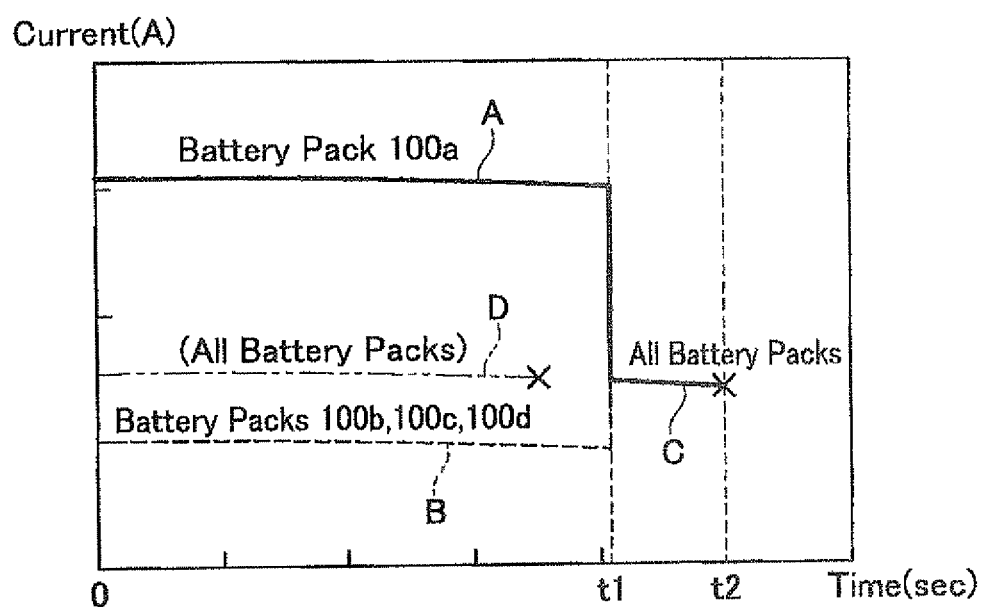
FIG. 7 is a graph illustrating variations in the flowing current of each battery pack with time.

FIG. 7 shows the flowing current of the battery packs 100a to 100d. From the time 0 to the time t1, power supply is performed in the connection state shown in FIGS. 5A and 5B, and from the time t1 to the time t2, power supply is performed in the connection state shown in FIGS. 6A and 6B. As shown by graphs A and B, before the time t1, the flowing current of the first battery pack 100a is large and the flowing current of the second to fourth battery packs 100b to 100d is small. Where the connection is changed at the time ti, the flowing current in all of the battery packs 100a to 100d becomes about the same, as shown by graph C. At the time t2, power supply from the battery packs 100a to 100d ends. Where the connection is not changed at the time t1, power supply from the battery packs 100a to 100d ends before the time t2. Graph D in FIG. 7 illustrates the case in which the battery packs 100a to 100d are connected as shown in FIGS. 6A and 6B from the very beginning (time 0). In this case, the second to fourth battery packs 100 with a small amount of remaining electric power are exhausted early and therefore, as shown in graph D, the power supply ends before the time t1.

Figure 8A:
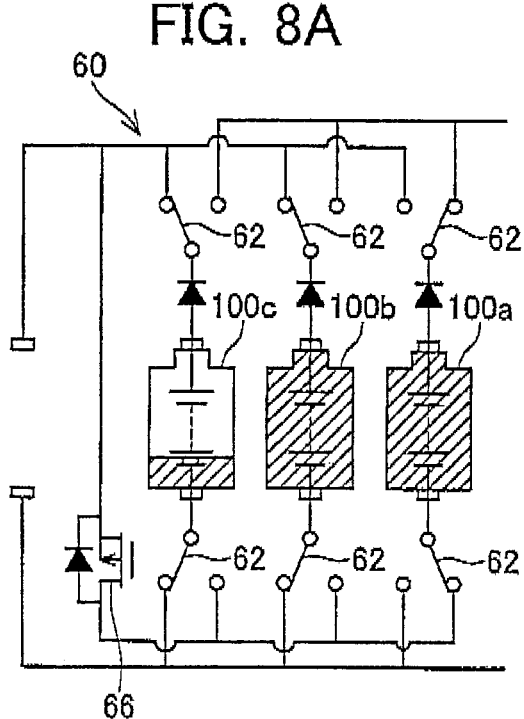
FIG. 8A shows an example of connection of three battery packs initially formed by a connection circuit.
Figure 8B:
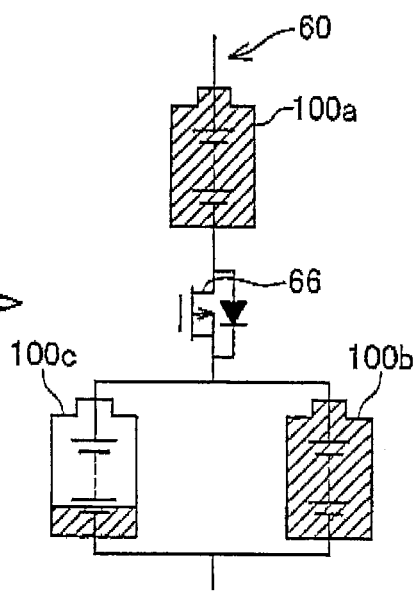
FIG. 8B shows schematically the connection shown in FIG. 8A.
Figure 8C:
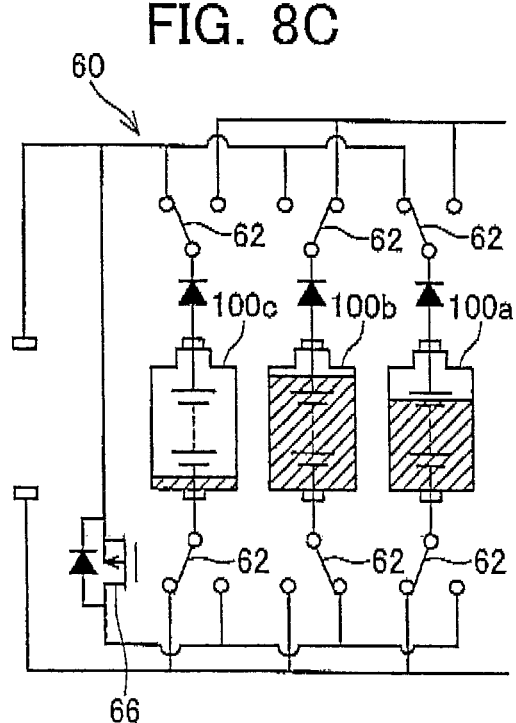
FIG. 8C shows an example of connection of three battery packs formed by a connection circuit after a change.
Figure 8D:
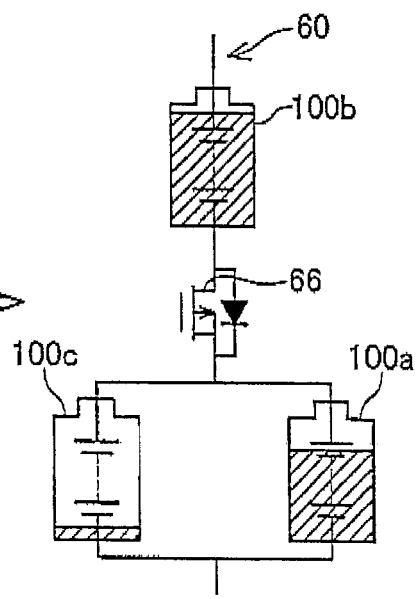
FIG. 8D shows schematically the connection shown in FIG. 8C.
Figure 9A:
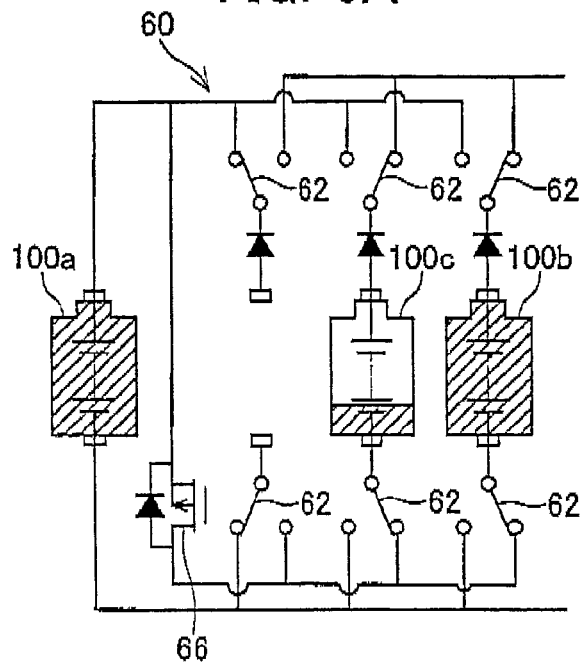
FIG. 9A shows still another example of connection of three battery packs initially formed by a connection circuit.
Figure 9B:
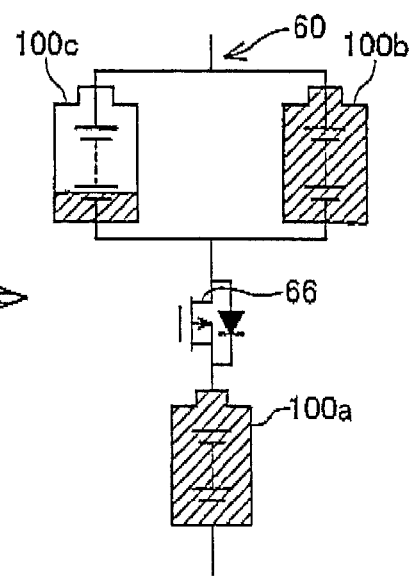
FIG. 9B shows schematically the connection shown in FIG. 9A.
Figure 9C:
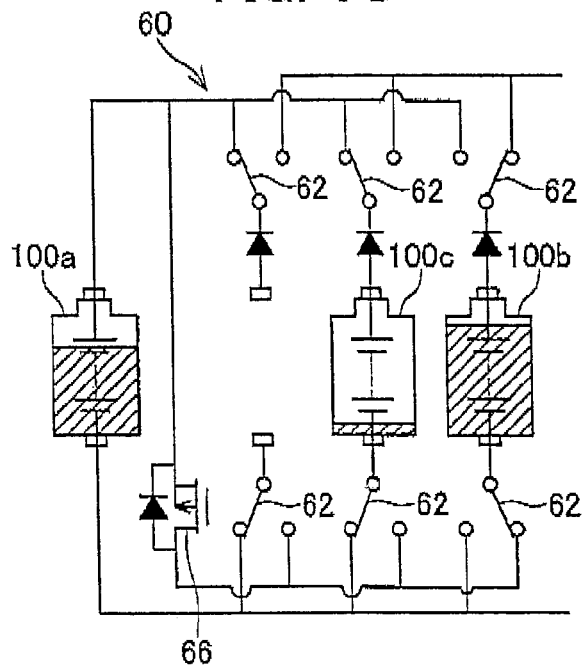
FIG. 9C shows still another example of connection of three battery packs formed by a connection circuit after a change.
Figure 9D:
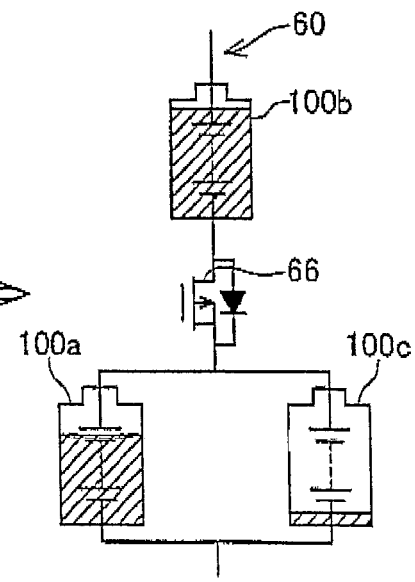
Figures 10A, 10B, 10C, 10D:
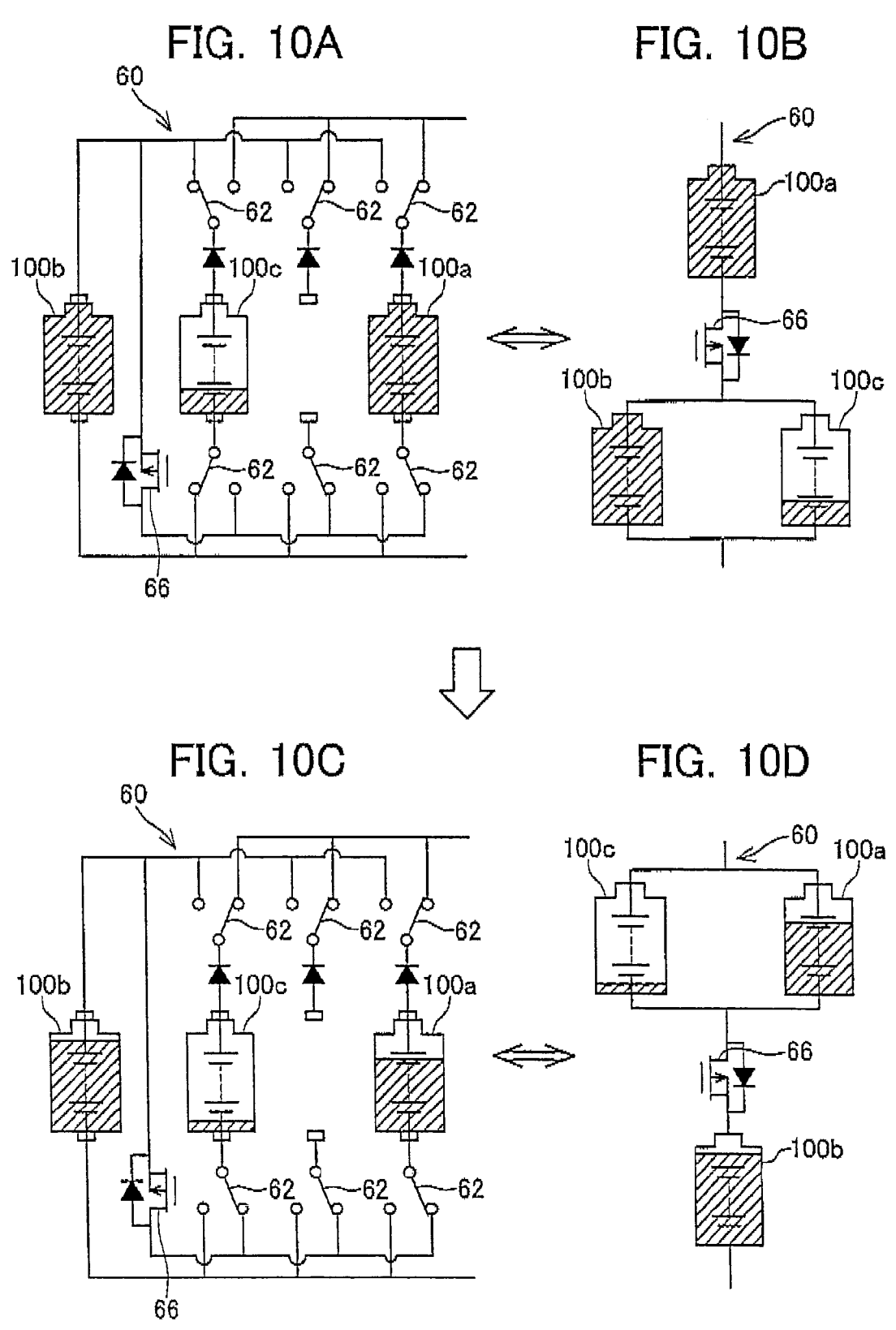

FIGS. 8A to 8D, 9A to 9D, and 10A to 10D illustrate the state in which three battery packs 100 are attached to the power supply device 10. Each of FIGS. 8A, 9A, and 10A shows the connection initially formed by the connection circuit 60. Each of FIGS. 8B, 9B, and 10B shows schematically the connection shown in FIGS. 8A, 9A, and 10A respectively, FIGS. 8C, 9C, and 10C shows the connection formed thereafter by the connection circuit 60, and FIGS. 8D, 9D, and 10D shows schematically the connection shown in FIGS. 8C, 9C, and 10C. The attachment positions of the three battery packs 100a to 100c differ among FIGS. 8A-D, 9A-D and 10A-10D. Even when only three battery packs 100a to 100c are connected, the connection circuit 60 forms the adequate connection according to the amount of remaining electric power in the battery packs 100a to 100c. Therefore, as shown in FIGS. 8A, 8B, 9A, 9B, 10A and 10B, the connection circuit 60 can realize substantially the same connection, regardless of the attachment positions of the battery packs 100a to 100c. Then, as shown in FIGS. 8C, 8D, 9C, 9D, 10C and 10D, even when the connection is changed according to the variations in the amount of remaining electric power, the connection circuit 60 realizes substantially the same connection.

(Embodiment 2)

The power supply system of Embodiment 2 will be explained below. In the power supply system of Embodiment 2, the processing performed by the main controller 40 in the power supply device 10 of Embodiment 1 is changed. No particular changes are required to be made in the mechanical and electrical configuration of Embodiment 1, and the reference numerals same as those of Embodiment 1 are used in the explanation below.

Figure 11A:
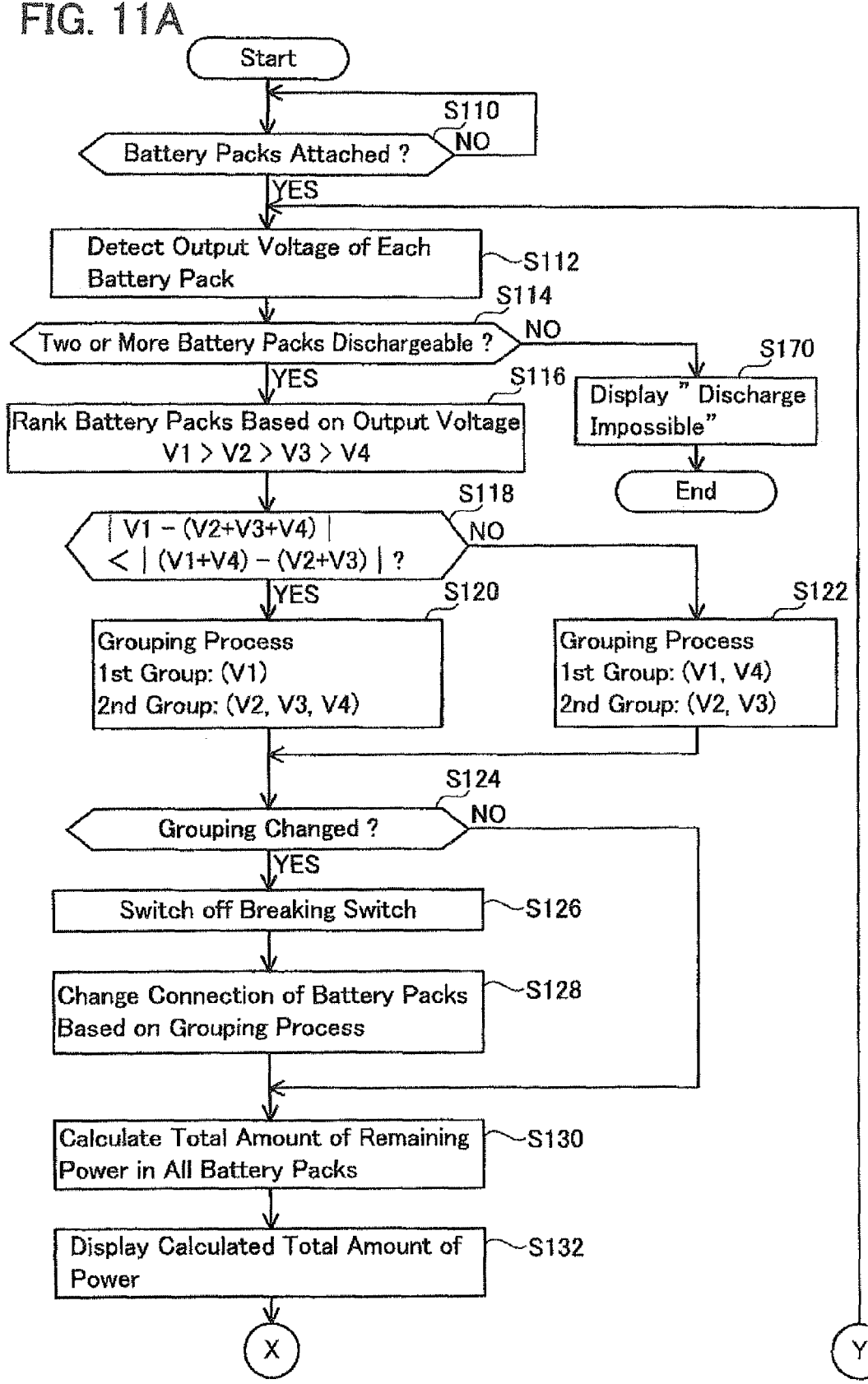
FIG. 11A is a flowchart illustrating, together with FIG. 11B, the operation of the power supply system of Embodiment 2, and in the figures, X in FIG. 11A is continued by X in FIG. 11B, and Y in FIG. 11A is the continuation of Y in FIG. 1B.
Figure 11B:
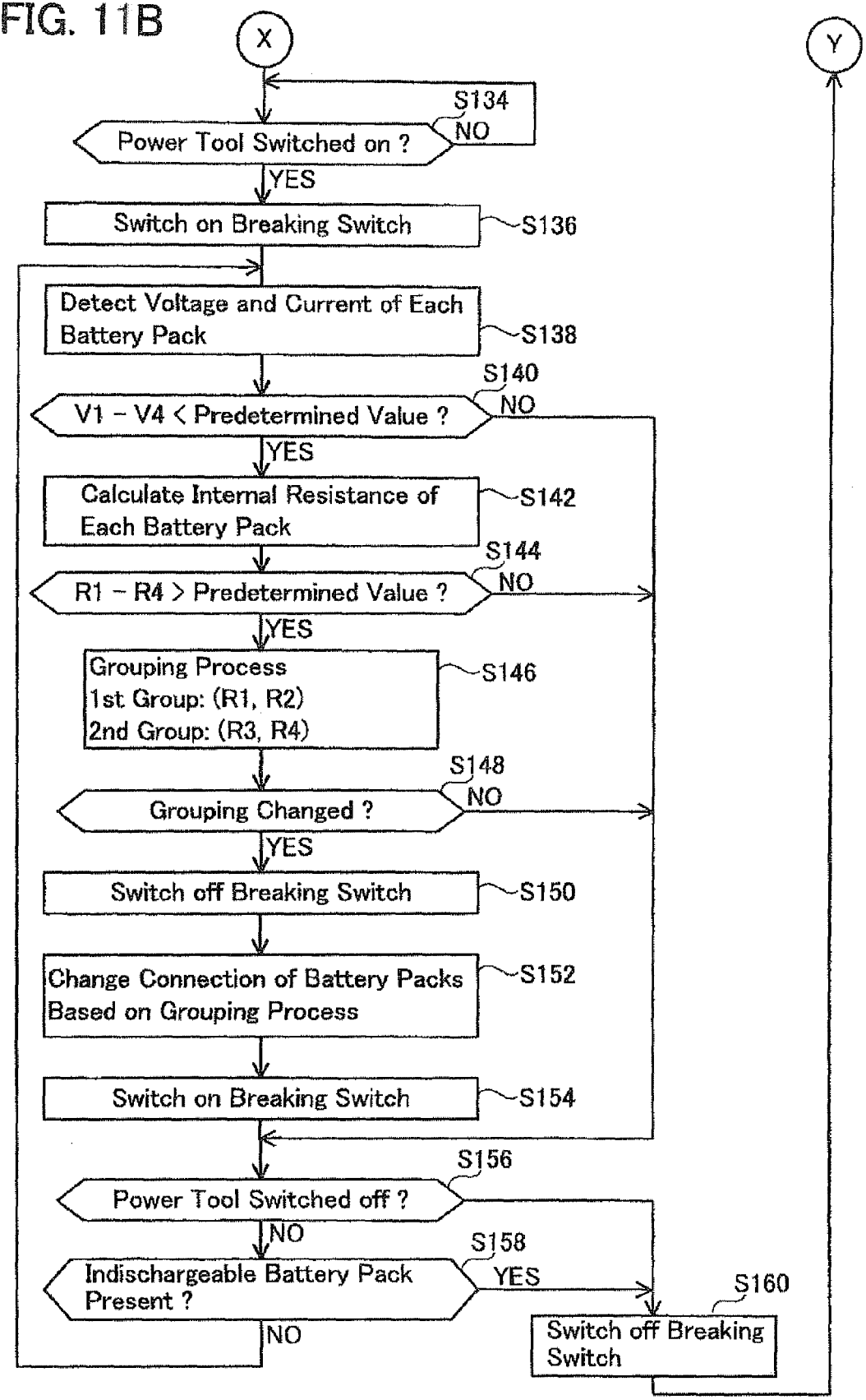
FIG. 11B is a flowchart illustrating, together with FIG. 11A, the operation of the power supply system of Embodiment 2.

FIGS. 11A and 11B are flowcharts illustrating the operation of the power supply device 10 of Embodiment 2. Where the battery packs 100 are attached to the battery interface 12 (step S110), the main controller 40 detects the output voltage of each battery pack 100 (S112). In step S114, the main controller 40 determines whether or not there are two or more dischargeable battery packs 100 on the basis of the output voltage of each battery pack 100 detected in step S112. When the detected output voltage is less than a predetermined discharge end voltage, the main controller 40 determines that the battery packs 100 cannot be discharged. Where there are two or more dischargeable battery packs 100, the main controller 40 advances to the processing of step S116; otherwise, the main controller advances to the processing of step S170. When the processing has advanced to step S170, the main controller 40 displays with the display unit 16 that the discharge is impossible and requests that the user replace the battery packs 100 (end of processing).

When the processing advances to step S116, the main controller 40 ranks the battery packs 100 on the basis of the output voltage of the battery packs 100 detected in step S112. Thus, the battery pack with the highest output voltage V1 is taken as the first battery pack 100, the battery pack with the second highest output voltage V2 is ranked as the second battery pack 100, the battery pack with the third highest output voltage V3 is ranked as the third battery pack 100, and the battery pack with the fourth highest output voltage V4 is ranked as the fourth battery pack 100. The output voltage of the battery packs 100 depends on the amount of remaining electric power in the battery packs 100. Therefore, the ranking of the battery packs 100 based on the output voltage, which is performed in Embodiment 2 in most cases produces the same result as the ranking of the battery packs 100 based on the amount of remaining electric power, which is performed in Embodiment 1.

Then, in steps S118, S120, and S122, the main controller 40 performs the grouping of the four attached battery packs 100 into two battery groups. In this case, the main controller 40 performs the grouping of the battery packs 100 such that a difference in total output voltages calculated for each battery group is minimized. For this purpose, in step S118, the main controller 40 determines whether or not Equation (2) below is fulfilled.

$$|V1-(V2+V3+V4)| < |(V1+V4)-(V2+V3)| \qquad (2)$$

The left side of Equation (2) above is an expression for calculating the difference in total output voltages (V1 and V2+V3+V4) between battery groups in the case where one battery group is constituted only by the first battery pack 100a and the other battery group is constituted by the second to fourth battery packs 100b to 100d (referred to hereinbelow as the first grouping). The right side of Equation (2) above is an expression for calculating the difference in total output voltages (V1+V4 and V2+V3) between battery groups in the case where one battery group is constituted by the first and fourth battery packs 100a and 100d and the other battery group is constituted by the second and third battery packs 100b and 100c (referred to hereinbelow as the second grouping). Thus, Equation (2) above determines the relationship between the difference in total output voltages between the battery groups in the case of the first grouping and the difference in total output voltages between the battery groups in the case of the second grouping. When Equation (2) is fulfilled, the main controller 40 advances to step S120; otherwise, the main controller 40 advances to step S122.

In steps S120, S122, the grouping of the battery packs 100*a* to 100*d* is determined. When the processing has advanced to step S120, the main controller 40 uses the first grouping. Where the processing has advanced to step S122, the main controller 40 uses the second grouping. As a result, among the first and second groupings, the grouping with a smaller difference in the total output voltages calculated for each battery group is selected. In steps S124 to S128, connection of the four battery packs 100 is changed on the basis of the grouping determined by the grouping processing. The processing of steps S124 to S128 is substantially identical to that of steps S24 to S28 shown in FIG. 4A and explained in Embodiment 1.

In step S130 the main controller 40 calculates the total amount of electric power remaining in all of the battery packs 100. The total amount of electric power is calculated on the basis of the detected output voltage of the battery packs 100. Then, in step S132, the main controller 40 displays the calculated total amount of electric power on the display unit 16. In step S134, the power supply device 10 stands by till the switch of the power tool 200 is switched on. Where the power tool 200 is switched on and the processing advances to step S136, the main controller 40 switches on the breaking switch 66 of the connection circuit 60. As a result, the supply of power from the battery packs 100 to the power tool 200 is started. In step S138, the main controller 40 detects the output voltage and flowing current of each battery pack 100. The processing of steps S130 to S138 is substantially identical to the processing of steps S30 to S38 shown in FIGS. 4A and 4B and explained in Embodiment 1.

In step S140, the main controller 40 determines whether or not the difference between the output voltage V1 of the first battery pack 100 having the highest voltage and the output voltage V4 of the fourth battery pack 100 having the lowest voltage is less than a predetermined determined value. In this case, where the difference V1–V4 between the output voltages is less than the determination value, it is possible to determine that the output voltages of the four battery packs 100 are substantially identical and the spread therebetween can be ignored. Thus, it is possible to determine that no large spread in the amount of remaining electric power is present among the four battery packs 100. In this case, the processing advances to step S142 and the processing of changing the connection based on the internal resistance of the battery packs 100 is performed. Meanwhile, where the difference V1–V4 between the output voltages is equal to or greater than the determination value, the processing advances to step S156 and the present connection based on the output voltage of the battery packs 100 is maintained.

In step S142, the main controller 40 detects the internal resistance of each battery pack 100. The internal resistance of battery packs 100 is calculated from the output voltage and flowing current of the battery packs 100 detected in step S112 and step S138. Thus, the internal resistance is calculated for each battery pack 100 by using the output voltage in a no-conduction state and the output voltage and flowing current in the conduction state.

In step S144, the main controller 40 calculates the difference between the detected maximum internal resistance R1 and minimum internal resistance R4 and determines whether or not the difference R1–R4 in the internal resistance exceeds a predetermined determination value. Where the difference R1–R4 in the internal resistance is equal to or less than the determination value, the internal resistance of the four battery packs 100 is substantially uniform and judgment can be made that internal resistance variation among the battery packs is negligible. In such a case, the processing advances to step S156 and the present connection state based on the output voltage of the battery packs 100 is maintained. Meanwhile, where the difference R1–R4 in the internal resistance exceeds the determination value, it can be determined that a spread that cannot be ignored is present among the four battery packs 100. In this case, the processing advances to step S146 and the processing of changing the connection based on the internal resistance is continued.

In step S146, the main controller 40 performs the grouping of the four battery packs 100 into two battery groups on the basis of the internal resistance of each battery pack 100. In the grouping, the two battery packs 100 having the largest internal resistance R1 and the second largest internal resistance R2 are classified in one battery group, and the two battery packs 100 having the third largest internal resistance R3 and the fourth largest internal resistance R4 are classified into the other battery group. With such grouping, the battery packs 100 with close internal resistances are classified into the same battery group.

Figure 3F:
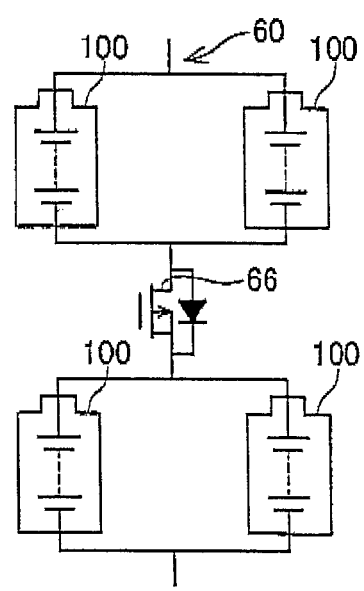

In steps S148 to S154, the connection of the battery packs 100 is changed on the basis of the determined grouping. First, in step S148, the main controller 40 determines whether or not the grouping has been changed in the above-described grouping processing. Where there is a change in the grouping, the main controller 140 advances processing to step S150; otherwise, the processing advances to step S156. Thus, where the grouping is not changed, the connection is also not changed. In step S150, the main controller 40 turns off the breaking switch 66 before the connection is changed. Then, in step S152, the main controller 40 selectively switches the relays 62 of the connection circuit 60 on the basis of the determined grouping. More specifically, the relays 62 are selectively switched so that the battery packs 100 classified into the same battery group are connected in parallel and the battery packs 100 classified into different battery groups are connected in series. Thus, the connection shown in FIG. 3F is formed. Then, in step S154, the main controller 40 again switches on the breaking switch 66. As a result, the supply of electric power to the power tool 200 is restarted.

As a result of the above-described change of connection, the battery packs 100 with close internal resistances are connected in parallel to each other. Therefore, the flowing current can be prevented from being unevenly distributed to one battery pack 100 among the parallel-connected two battery packs 100. As a result, overheating or abnormal degradation of the battery packs 100 is inhibited.

In step S156, the main controller 40 determines whether or not the switch of the power tool 200 is switched off. Where the switch of the power tool 200 is switched off, the main controller 40 advances to step S160 and switches off the breaking switch 66. The processing then returns to step S112. Where the switch of the power tool 200 is not switched off, the processing advances to step S158 and the main controller 40 detects whether the battery pack 100 that cannot be discharged is present. Whether or not the battery pack 100 can be discharged is determined on the basis of the output voltage of the battery pack 100 detected in step S138. When the battery pack 100 that cannot be discharged is present, the main controller 40 advances to step S160 and switches off the breaking switch 66. Otherwise, the main controller 40 returns to the processing of step S112.

As described hereinabove, with the power supply deice 10 of Embodiment 2, the connection of battery packs 100 can be changed on the basis of output voltage and flowing current of the battery packs 100. In particular, the main controller 40 can detect the internal resistance from the output voltage and flowing current of the battery packs 100 and determine the connection of the battery packs 100 on the basis of the detected internal resistance. As a result, a large amount of electric power stored in the battery packs 100 can be supplied, while suppressing the overheating and abnormal degradation of the battery packs 100. In this case, the internal resistance of the battery packs 100 increases according to the usage history (amount of usage, usage period, past temperature) of the battery packs 100. Therefore, it is possible to detect the usage history of the battery packs 100 instead of the internal resistance of the battery packs 100 and determine the connection of the battery packs 100 on the basis of the detected usage history. The usage history information indicating the usage history of the battery packs 100 is stored in the battery controller 114 of the battery packs 100. Therefore, the main controller 40 can determine the connection based on the usage history by reading the usage history information from the battery controller 114.

Specific examples of the present teachings are described above in detail, but these examples are merely illustrative and place no limitation on the scope of the patent claims. The technology described in the patent claims also encompasses various changes and modifications to the specific examples described above.

Figure 12:
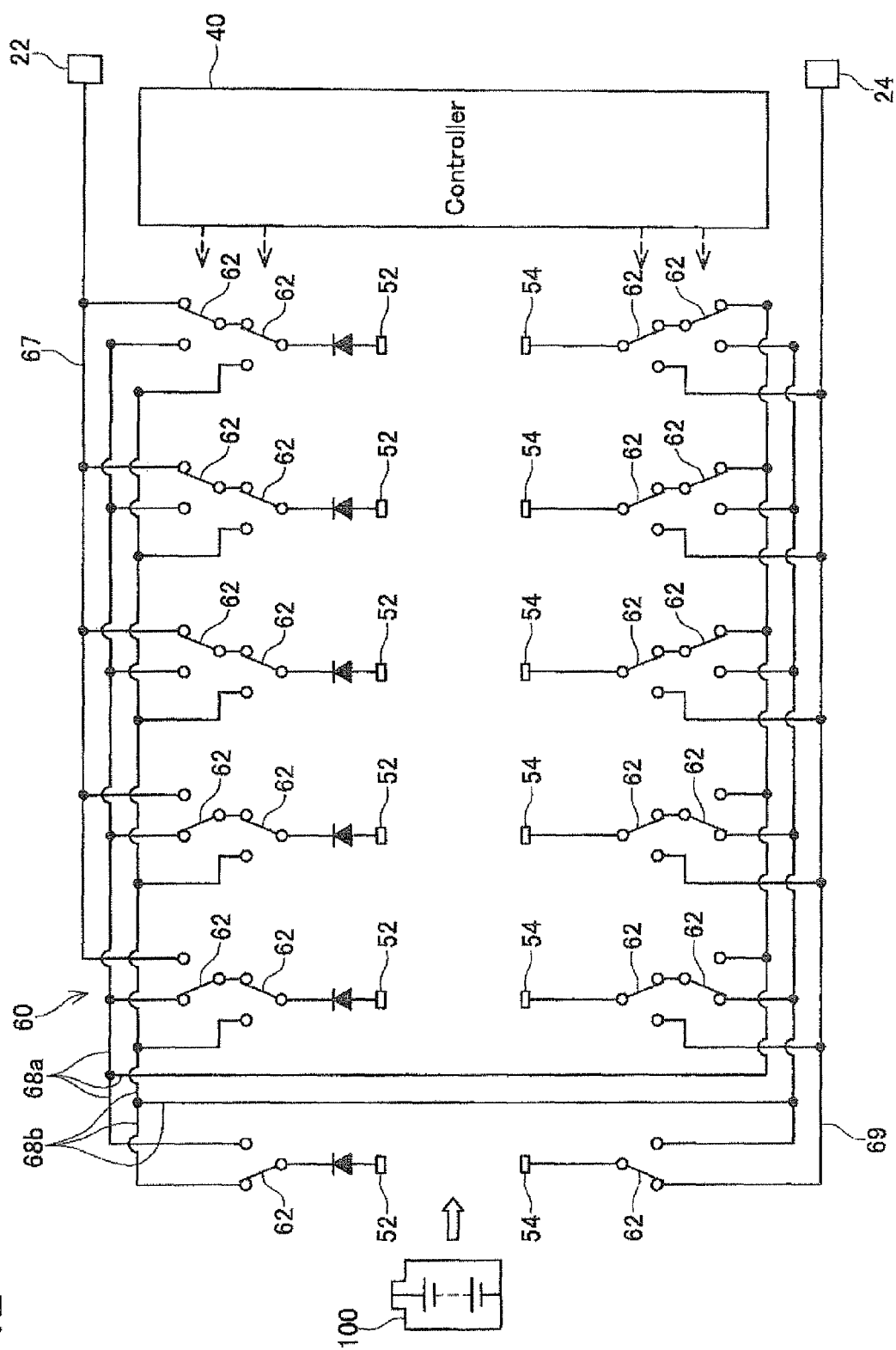
FIG. 12 is a configuration example illustrating the connection for six battery packs.

For example, at least three battery packs 100 may be attached to the power supply device 10, or a structure capable of receiving a larger number of battery packs 100 can be also used. In this case, the configuration of the connection circuit 60 may be changed according to the number of the attachable battery packs 100. FIG. 12 shows an example of the connection circuit 60 adapted to six battery packs 100. In the connection circuit 60, three battery packs 100 can be connected in series, and electric power can be supplied to an electrical apparatus such as the power tool 200 at a voltage that is three times the output voltage of the battery pack 100. By contrast with the connection circuit 60 shown in FIG. 2, the connection circuit 60 shown in FIG. 12 is configured to have two-system medium-potential connection wires 68a, 68b and use 22 relays 62.

Further, the power supply devices 10 of the above-described embodiments use rechargeable battery packs 100, but with the features used in the power supply devices 10, it is also possible to realize a power supply device that uses non-rechargeable batteries (primary batteries). For example, in the conventional electrical apparatus using a plurality of dry cells, it is recommended that all of the dry cells be replaced at the same time and the mixed use of new dry cells and old dry cells is prohibited. Therefore, even if the user has dry cells which are not new but still usable, it is necessary to purchase anew the entire set of dry batteries necessary for the electric device. By contrast, by using the features of the power supply device 10 described in the present specification, the user can effectively use dry cells which are not new but still usable.

Further, the power supply device 10 of the present embodiments is configured to be separate from the electrical apparatus, but the power supply device 10 may be integrally incorporated in the electrical apparatus.

The technical elements explained in the present specification or drawings provide technical utility either independently or through various combinations. The present teachings are not limited to the combinations described at the time the claims are filed. Further, technologies exemplified in the present specification or drawings are to satisfy multiple objectives simultaneously, and satisfying any one of those objectives gives technical utility to the present teachings.

The invention claimed is:

1. A power supply device that supplies electric power from a plurality of batteries to an electrical apparatus, the power supply device comprising:
   a plurality of battery interfaces configured to removably receive at least three batteries including a first battery, a second battery and a third battery, wherein each of the first, second and third batteries includes a positive electrode terminal and a negative electrode terminal;
   a connection circuit configured to electrically connect the at least three batteries to each other, wherein the connection circuit is capable of connecting at least two batteries in parallel and connecting at least one other battery to the at least two parallel-connected batteries in series and includes:
      a high-voltage conductive line,
      a low-voltage conductive line,
      a medium-voltage conductive line including a first portion and a second portion,
      a first switch configured to electrically and selectively connect the positive electrode terminal of the first battery to one of the high-voltage conductive line or the first portion of the medium-voltage conductive line,
      a second switch configured to electrically and selectively connect the positive electrode terminal of the second battery to one of the high-voltage conductive line or the first portion of the medium-voltage conductive line,
      a third switch configured to electrically and selectively connect the positive electrode terminal of the third battery to one of the high-voltage conductive line or the first portion of the medium-voltage conductive line,
      a fourth switch configured to electrically and selectively connect the negative electrode terminal of the first battery to one of the low-voltage conductive line or the second portion of the medium-voltage conductive line,
      a fifth switch configured to electrically and selectively connect the negative electrode terminal of the second battery to one of the low-voltage conductive line or the second portion of the medium-voltage conductive line,
      a sixth switch configured to electrically and selectively connect the negative electrode terminal of the third battery to one of the low-voltage conductive line or the second portion of the medium-voltage conductive line, and
   a pair of output terminals configured to output electric power from the at least three batteries while the connection circuit electrically connects the at least one other battery to the at least two parallel-connected batteries,
   wherein the connection circuit is capable of switching connection state of the at least three batteries among:
      a first state connecting the second battery to the third battery in parallel and connecting the first battery to the second and third batteries in series; and
      a second state connecting the first battery to the third battery in parallel and connecting the second battery to the first and third batteries in series; and
      a third state connecting the first battery to the second battery in parallel and connecting the third battery to the first and second batteries in series.

2. The power supply device as in claim 1, wherein the connection circuit is capable of changing a combination of batteries connected in parallel without requiring to change positions of the batteries in the battery interfaces.

3. The power supply device as in claim 1, further comprising:
- a detector configured to detect at least one indicator indicative of a condition of each battery attached to the battery interfaces; and
- a processor configured to group the at least three batteries into at least two battery groups such that at least one of the battery groups includes at least two batteries,
- wherein the connection circuit is configured to connect batteries grouped in the same battery group in parallel and connect batteries grouped in different battery groups in series.

4. The power supply device as in claim 3, wherein the detector is configured to detect, as the indicator indicative of a condition of the battery, at least one of:
- an amount of electric power remaining in the battery, a voltage of the battery, an internal resistance of the battery, a flowing current of the battery, usage quantity of the battery, a degree of degradation of the battery and a temperature of the battery.

5. The power supply device as in claim 3, wherein
- the detector is configured to detect at least an amount of electric power remaining in each battery, and
- the processor is configured to perform the grouping such that a difference in total amounts of electric power between the at least two battery groups becomes minimized.

6. The power supply device as in claim 5, wherein the processor is configured to:
- calculate the differences in the total amounts of electric power between the at least two battery groups for at least two different groupings, and
- select either one of the groupings in which the calculated difference is the smallest.

7. The power supply device as in claim 1, further comprising:
- a breaker configured to electrically break the connection circuit during when the connection circuit changes connection of the batteries.

8. The power supply device as in claim 7, wherein the breaker is configured to be located between two batteries that are connected in series regardless of a manner of the connection of the batteries.

9. The power supply device as in claim 1, wherein the connection circuit is capable of changing the connection of the at least three batteries based on output voltages of the at least three batteries output while the electric power is supplied from the at least three batteries to the electrical apparatus.

10. The power supply device as in claim 1, wherein
- the connection circuit further includes a breaker (1) disposed on the medium-voltage conductive line, (2) located between the first and second portions of the medium-voltage conductive line, and (3) configured to be capable of breaking an electrical connection between the first and second portions.

11. The power supply device as in claim 1, wherein the medium-voltage conductive line is configured to be electrically isolated from all the first, second and third batteries when the first, second and third switches electrically connect the respective positive electrode terminal of the first, second and third batteries to the high-voltage conductive line and fourth, fifth and sixth switches electrically connect the respective negative electrode terminal of the first, second and third batteries to the low-voltage conductive line.

* * * * *